United States Patent
Yoneda et al.

(10) Patent No.: US 7,360,431 B2
(45) Date of Patent: Apr. 22, 2008

(54) PRESSURE SENSOR DEVICE INCLUDING A DIAPHRAGM AND A STOPPER MEMBER HAVING A CURVED SURFACE FACING THE DIAPHRAGM

(75) Inventors: Masayuki Yoneda, Tokyo (JP); Jun Mizoguchi, Tokyo (JP); Yasuhiro Kajio, Tokyo (JP); Masaya Ishikawa, Tokyo (JP); Youichi Azuma, Tokyo (JP); Naohisa Tsuchiya, Tokyo (JP)

(73) Assignee: Yamatake Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 10/567,999
(22) PCT Filed: Aug. 20, 2004
(86) PCT No.: PCT/JP2004/012001
§ 371 (c)(1),
(2), (4) Date: Feb. 10, 2006
(87) PCT Pub. No.: WO2005/019789
PCT Pub. Date: Mar. 3, 2005

(65) Prior Publication Data
US 2006/0272422 A1 Dec. 7, 2006

(30) Foreign Application Priority Data
Aug. 20, 2003 (JP) .............................. 2003-296695

(51) Int. Cl.
*G01L 9/12* (2006.01)
(52) U.S. Cl. .................. 73/724; 73/715; 361/283.1
(58) Field of Classification Search .......... 73/700–756; 361/283.1–283.4
See application file for complete search history.

(56) References Cited

U.S. PATENT DOCUMENTS

| 4,458,537 | A | * | 7/1984 | Bell et al. ....................... 73/718 |
| 4,519,255 | A | | 5/1985 | Ishii |
| 4,833,920 | A | * | 5/1989 | Knecht et al. ................. 73/717 |
| 5,381,299 | A | * | 1/1995 | Provenzano et al. ..... 361/283.4 |
| 6,019,135 | A | * | 2/2000 | Onishi ......................... 138/30 |
| 6,079,450 | A | * | 6/2000 | Onishi et al. .................. 138/30 |
| 6,267,009 | B1 | * | 7/2001 | Drewes et al. ................. 73/718 |
| 6,971,859 | B2 | * | 12/2005 | Yamamoto et al. .......... 417/395 |

FOREIGN PATENT DOCUMENTS

| CN | 87 2 07839 U | 7/1988 |
| JP | 52-043474 | 4/1977 |
| JP | 58-180927 A | 10/1983 |
| JP | 10-78366 A | 3/1998 |

* cited by examiner

*Primary Examiner*—Edward Lefkowitz
*Assistant Examiner*—Jermaine Jenkins
(74) *Attorney, Agent, or Firm*—Frishauf, Holtz, Goodman & Chick, P.C.

(57) ABSTRACT

The pressure sensor device has a laminated diaphragm (12) in which a strain resistance gauge is formed in a surface and a stopper member (13) including a concave portion forming a curved surface parallel to a surface formed by displacement of the diaphragm, the concave portion being disposed to face the diaphragm. Specifically, the concave portion of the stopper member is formed into a curved surface in which depth y at a distance x from the center of the diaphragm is expressed by a quartic function $[y=pr^4(1-x^2/r^2)^2/64D]$ in relation to the operating pressure for protection against maximum pressure p when the diaphragm has a radius of r, a thickness of t, and a flexural rigidity of D.

5 Claims, 9 Drawing Sheets

PRESSURE SENSOR DEVICE INCLUDING A DIAPHRAGM AND A STOPPER MEMBER HAVING A CURVED SURFACE FACING THE DIAPHRAGM

This application is a U.S. National Phase Application under 35 USC 371 of International Application PCT/JP2004/012001 filed Aug. 20, 2004.

TECHNICAL FIELD

The present invention relates to a pressure sensor device capable of sufficiently increasing operating pressure for protection against maximum pressure and having a simple structure that can be downsized.

BACKGROUND ART

A diaphragm-type pressure sensor device has a sensor chip in which, schematically, a strain resistance gauge is formed on a laminated diaphragm made of silicon, glass or the like. Based on a change of a resistance value of the strain resistance gauge formed in the diaphragm that is displaced by pressure, the pressure sensor device detects the pressure applied to the diaphragm.

For example, a pressure sensor device of this type is configured by installing a sensor chip 1 having a diaphragm, for example, into a meter body 2 shown in FIG. 13. The meter body 2 has barrier diaphragms 4a and 4b forming a pair of pressure-receiving portions in a body portion 3 thereof. The meter body 2 has a structure in which the sensor chip (pressure sensor) 1 installed in a sensor portion 5 communicates with the barrier diaphragms 4a and 4b through pressure-absorbing chambers 7a and 7b, respectively, which are separated by a center diaphragm 6 with a large diameter. A pressure-transmitting medium such as silicone oil is injected into connecting paths 8a and 8b that connect the sensor chip 1 and the barrier diaphragms (pressure-receiving portions) 4a and 4b.

With the meter body 2 thus configured, as FIG. 14 schematically shows an aspect of the operation thereof, pressures Pa and Pb applied to the barrier diaphragms 4a and 4b are led to both sides of a diaphragm, not shown, of the sensor chip 1 through the pressure-absorbing chambers 7a and 7b separated by the center diaphragm 6 in a steady state. As a result, the diaphragm of the sensor chip (pressure sensor) 1 shows displacement corresponding to differential pressure between the pressures Pa and Pb, that is, ΔP(=Pa−Pb).

On the other hand, if either of the barrier diaphragms 4a and 4b is applied with maximum pressure $P_{over}$, the barrier diaphragm 4a is greatly displaced, for example, as shown in FIG. 15. In response to the great displacement of the barrier diaphragm 4a, the center diaphragm 6 is so displaced as to absorb the maximum pressure $P_{over}$. When the barrier diaphragm 4a reaches the bottom of the body portion 3, and the displacement thereof is restricted, this hinders further transmission of the pressure P through the barrier diaphragm 4a. Consequently, the sensor chip 1 is prevented from being damaged by application of the maximum pressure $P_{over}$. The sensor chip 1 detects only the differential pressure ΔP between the pressures Pa and Pb applied to the pair of barrier diaphragms 4a and 4b.

The pressure sensor device in which the sensor chip 1 is installed in the meter body 2 has the barrier diaphragms 4a and 4b and the center diaphragm 6 as mentioned. The pressure sensor device has a configuration in which the sensor chip 1 is protected from the maximum pressure $P_{over}$ by functions of the diaphragms 4a, 4b and 6. Therefore, it is undeniable that the entire shape of the pressure sensor device including the meter body 2 is large-scaled. In this respect, there is not only a demand for downsizing of the pressure sensor device but also an intense demand for sufficient increase of operating pressure for protection against maximum pressure (withstand pressure) of the pressure sensor device.

In order to prevent accidental damage or breakdowns of diaphragms, for example, Unexamined Japanese Patent Publication No. 10-78366 proposes that a backup (stopper) portion be so disposed as to face a diaphragm of the sensor chip 1 with the prescribed space therebetween, to thereby prevent excessive displacement of the diaphragm in the backup (stopper) portion. Specifically, the publication describes that if the backup portion is formed into a stepped concave surface, even when the diaphragm is displaced by application of the maximum pressure, stress concentration does not occur in the rim portion of the diaphragm.

However, even if the stepped backup (stopper) portion is so disposed as to face the diaphragm, this merely increases the operating pressure for protection against maximum pressure severalfold at most, as compared to the withstand pressure possessed by the sensor chip 1 itself. Accordingly, in order to improve the detection sensitivity with respect to the differential pressure ΔP and set the operating pressure for protection against maximum pressure at sufficiently high degree, it is essential in general to use the meter body 2 of the above-described structure. Consequently, the necessity of the meter body 2 is a great issue in consideration of downsizing of the pressure sensor device.

DISCLOSURE OF THE INVENTION

The present invention has been made in light of the above circumstances, and an object thereof is to provide a pressure sensor device capable of sufficiently increasing operating pressure for protection against maximum pressure with respect to a sensor chip and having a simple structure that can be downsized.

In order to achieve the above object, the pressure sensor device according to the present invention is characterized by having a laminated diaphragm in which a strain resistance gauge is formed in a surface thereof, and a stopper member including a concave portion made up of a curved surface parallel to a surface formed by displacement of the diaphragm, the concave portion being disposed so as to face the diaphragm. Preferably, the pressure sensor device is characterized in that the stopper member is provided to both sides of the diaphragm.

In other words, the pressure sensor device according to the present invention is characterized in that the shape of the stopper member disposed to face the diaphragm is formed into a concave portion forming a curved surface parallel to the surface formed by displacement of the diaphragm. More specifically, the pressure sensor device is characterized in that the concave portion included in the stopper member is formed into a curved surface in which when the diaphragm has a radius of r, a thickness of t, and a flexural rigidity of D, depth y at a distance x from the center of the diaphragm in relation to the operating pressure for protection against maximum pressure p is expressed by a quartic function:

$$y = pr^4(1 - x^2/r^2)^2 / 64D$$

$$D = Et^3 / 12(1 - v^2)$$

where E is Young's modulus, and v is Poisson's ratio.

With the pressure sensor device having a structure in which the stopper member including the concave portion forming the above-described curved surface is disposed to face the diaphragm, the entire diaphragm that is displaced upon receiving maximum pressure is brought into uniform contact to the concave portion of the stopper member. Therefore, all the pressure applied to the diaphragm is evenly received by the curved surface of the concave portion of the stopper member. As a result, local stress concentration does not occur in the diaphragm, and the maximum pressure applied to the diaphragm is evenly dispersed through the entire diaphragm, which makes it possible to effectively prevent a breakdown of the diaphragm. It is also possible to sufficiently increase operating pressure for protection against maximum pressure p as the pressure sensor device.

In case that a pressure transmitting medium such as silicone oil is led to the diaphragm, it is preferable that a leading hole for the pressure-transmitting medium be formed in a top portion of the concave portion forming the curved surface of the stopper member. If the pressure leading hole is formed in the top portion of the concave portion in the stopper member as mentioned, the presence of the pressure leading hole that opens in the curved surface of the concave portion can be practically disregarded. Therefore, it is possible to easily design the curved surface of the concave portion in view of only a displacement characteristic of the diaphragm, which is caused by pressure application.

The pressure sensor device according to the present invention is characterized by having a diaphragm in which a strain resistance gauge is formed in the surface thereof, a pair of stopper members including respective concave portions made up of curved surfaces parallel to surfaces formed by displacement of the diaphragm, the concave portions being provided to both sides of the diaphragm so as to face the diaphragm, and a base including fluid paths that lead a pressure-transmitting medium from top portions of the concave portions in the stopper members to both sides of the diaphragm and a pair of pressure-receiving portions connected to the respective fluid paths to transmit pressure to the pressure-transmitting medium injected into the fluid paths.

The sensor chip formed of the diaphragm and the stopper members are preferably mounted on the base made of brass, stainless steel or the like, with a pressure-absorbing body such as glass interposed therebetween.

According to the present invention, since there are provided the stopper members including the concave curved surfaces parallel to the surfaces formed by displacement of the diaphragm, it is possible to effectively prevent a breakdown of the diaphragm attributable to maximum pressure and to sufficiently increase the withstand pressure thereof in spite of the simple structure. Consequently, the present invention offers practically significant advantages including the advantage that there is no need for a meter body with a center diaphragm, which enables substantial downsizing.

BEST MODE FOR CARRYING OUT THE INVENTION

A pressure sensor device according to an embodiment of the present invention will be described below with reference to the drawings.

Figure 1:
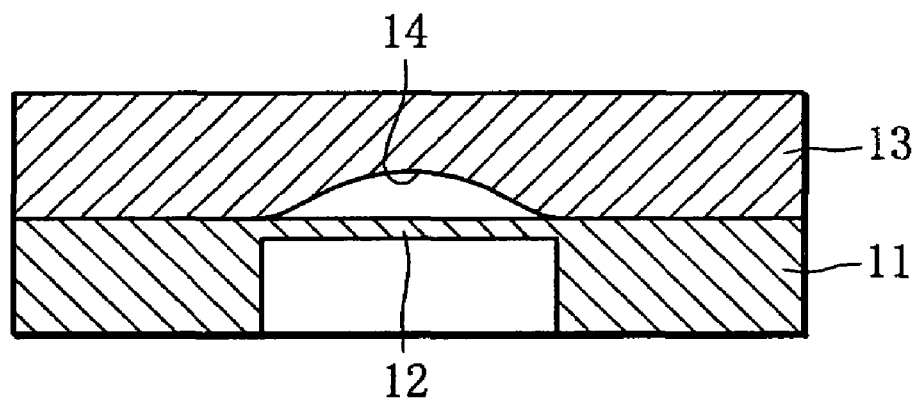
FIG. 1 is a view showing a basic structure of a pressure sensor device according to the present invention.

FIG. 1 is a sectional view of a substantial part, showing a basic structure of a pressure sensor device according to the present invention. Reference numeral 11 represents a base body in which a thin diaphragm 12 with a prescribed diameter is formed. The base body 11 is made of brittle material such as silicon (Si) and glass. Reference numeral 13 denotes a stopper member that includes a concave portion 14 facing the diaphragm 12 and is integrally joined to the base body 11. The concave portion 14 is formed as a curved surface parallel to a surface (displacement surface) formed by displacement of the diaphragm 12.

The curved surface of the concave portion 14 is a curved surface in which when the diaphragm 12 has a radius of r, a thickness of t, and a flexural rigidity of D, depth y at a distance x from the center of the diaphragm 12 in relation to operating pressure for protection against maximum pressure p is expressed by a quartic function:

$$y=pr^4(1-x^2/r^2)^2/64D$$

$$D=Et^3/12(1-v^2)$$

where E is Young's modulus, and v is Poisson's ratio. The curved surface forming the concave portion 14 is made up of a quartic curved surface that is so-called an aspheric surface.

For example, displacement that is caused when a pressure of 300 kPa that is operating pressure for protection against maximum pressure p is applied to the diaphragm 12 made of silicon (Si), the diameter of which r is 1.15 mm, and thickness t is 0.03 mm, and more specifically displacement amount y in a portion located at the distance x from the center of the diaphragm 12, is expressed by a quartic function:

$$y=0.012x^4-0.032x^2+0.021$$

where Young's modulus E is $1.72 \times 10^{11}$ Pa, and Poisson's ratio ν is 0.064. In the present invention, the curved surface of the concave portion 14 in the stopper member 13 is formed as a surface parallel to the displacement surface of the diaphragm 12 expressed by the above quartic function.

The stopper member 13 including the concave portion 14 as described above can be fabricated usually by direct polishing/grinding through machining of a forming material. It is also possible to fabricate the stopper member 13 by applying lithography technology used in the process of IC fabrication. To be concrete, resist applied to the surface of a silicon substrate or glass substrate that is the forming material of the stopper member 13 is exposed by using a gray scale mask the light transmittance of which is changed, to thereby form a free curved surface (concave surface) in the resist. Thereafter, the silicon substrate or glass substrate is directly subjected to dry-etching or the like together with the resist in which the free curved surface is formed, to thereby form the free curved surface (concave surface) in the silicon substrate or glass substrate. By so doing, the stopper member 13 including the concave portion 14 is fabricated.

In case that the stopper member 13 including the concave portion 14 is fabricated by press-molding technology, a mold obtained by forming a convex curved surface serving as a counterpart to a required concave curved surface in superhard steel, ceramics or glassy carbon by precision machining is prepared. For example, by pressing the glass softened at high temperature in a vacuum with the mold, the stopper member 13 in which the concave portion 14 that is the required curved surface is fabricated.

Figure 2:
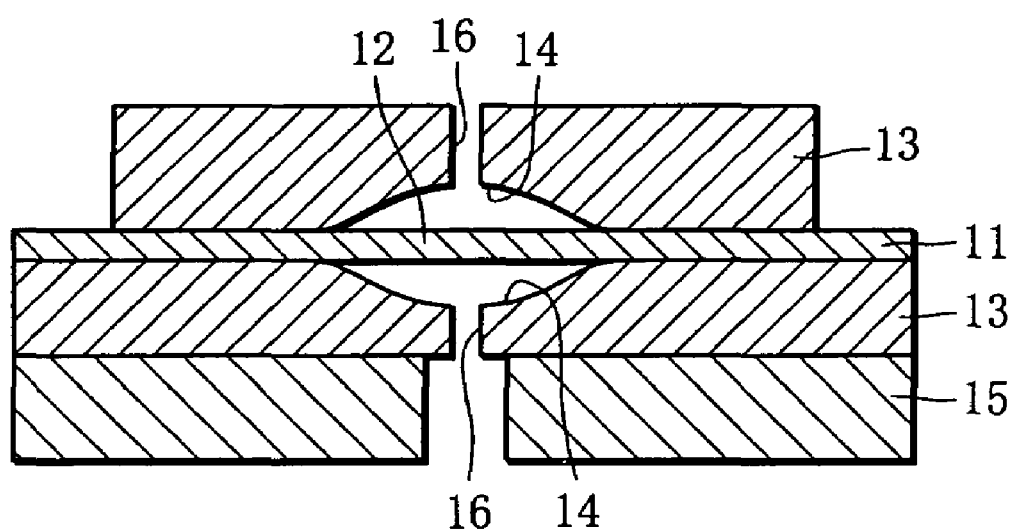
FIG. 2 is a view showing a basic structure of a differential pressure-type pressure sensor device according to the present invention.

In case that the pressure sensor device is configured as a differential pressure type that detects the differential pressure ΔP between pressures P1 and P2 applied to both sides of the diaphragm 12, as illustrated in FIG. 2 showing a schematic sectional structure, the stopper members 13 including the respective concave portions 14 are provided to both sides of the diaphragm 12, and they are integrally joined to each other. In this case, the base body 11 forming the diaphragm 12 is often laminated, and a part thereof is used as the diaphragm 12. Accordingly, including the stopper members 13 sandwiching the diaphragm 12 in a position attached to both sides of the laminated diaphragm 12 to be integrally joined to each other, the whole is preferably fixed onto a seat 15 having prescribed thickness, which is made of silicon (Si), glass or the like. Pressure leading holes 16 for leading pressure to the diaphragm (diaphragm surface) 12 are provided to top portions of the concave portions 14 formed in the stopper members 13 as shown in FIG. 2 as through-holes of such a size as not to damage the curved surfaces of the concave portions 14.

As shown in FIGS. 1 and 2, according to the pressure sensor device having the structure in which the stopper members 13 including the concave portions 14 (referred to as aspheric stoppers) formed of concave curved surfaces are so disposed as to face the diaphragm 12, when the diaphragm 12 is displaced upon receiving maximum pressure, the entire displacement surface can be received by the concave curved surface of the concave portion 14. This makes it possible to prevent local stress concentration caused in the diaphragm 12. Since the displacement of the diaphragm 12 is received by the entire concave curved surface of the concave portion 14, the diaphragm 12 can be effectively prevented from being accidentally broken due to application of maximum pressure, to thereby sufficiently increase the operating pressure for protection against maximum pressure (withstand pressure) p.

Figure 3:
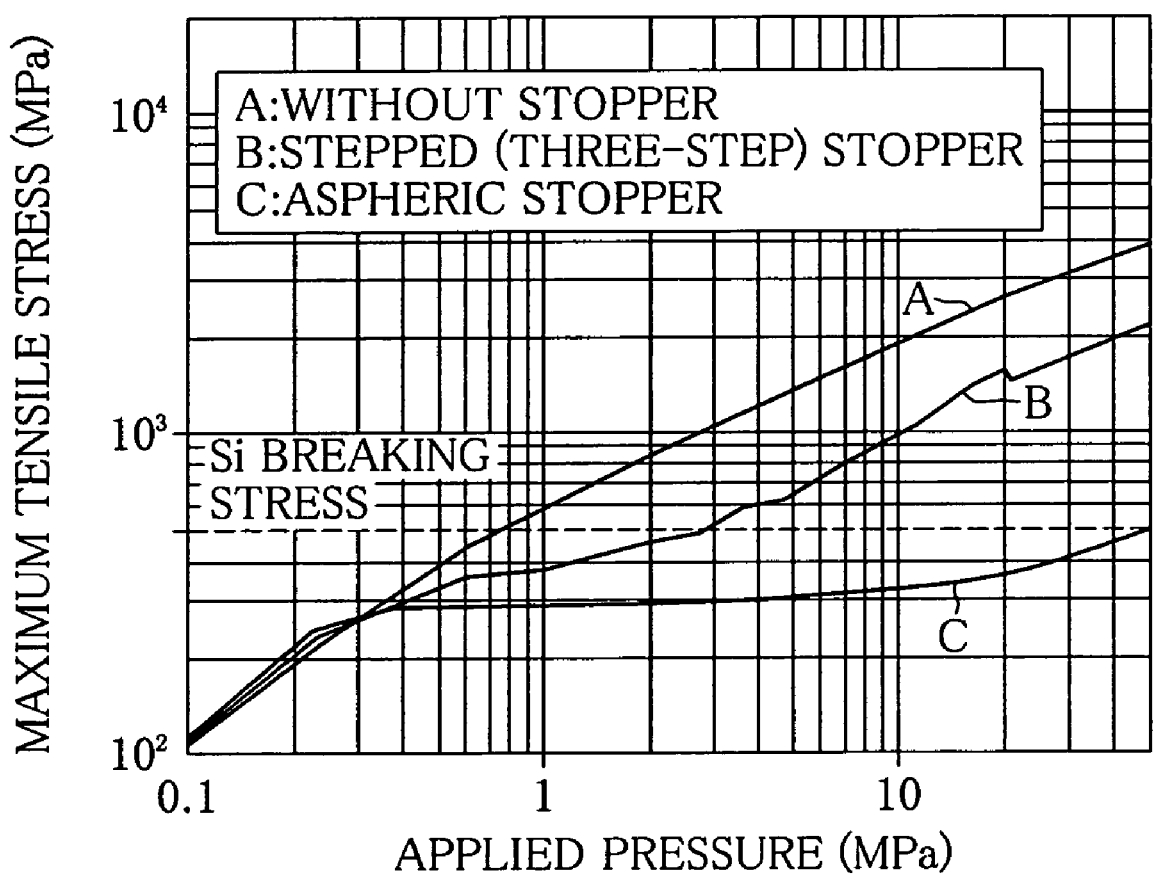
FIG. 3 is a view showing in comparison the relationship of maximum tensile stress with respect to applied pressure of diaphragms, which is determined by the presence of stopper members and a difference in the shape of the stopper members.

FIG. 3 shows findings about the relationship (characteristics A, B and C) of maximum tensile stress with respect to the applied pressure of a diaphragm without a stopper, a diaphragm with a stepped stopper disclosed in Unexamined Japanese Patent Publication No. 10-78366, and a diaphragm with an aspheric stopper according to the present invention, in contrast with each other. As is apparent from comparison of characteristics A, B and C shown in FIG. 3, the diaphragm with the aspheric stopper according to the present invention makes it possible to suppress the maximum tensile stress thereof to be equal to or less than a breaking stress limit of silicon (Si) that is material of the diaphragm so that the applied pressure reaches 50 MPa.

In the case of the diaphragm without a stopper, when the applied pressure is over 700 kPa, the maximum tensile stress exceeds the breaking stress limit of silicon (Si). In the case of the diaphragm having the stepped stopper, when the applied pressure is over 3 MPa, the maximum tensile stress exceeds the breaking stress limit of silicon (Si). That the maximum tensile stress exceeds the breaking stress limit of silicon (Si) means that silicon (Si) that is material of the diaphragm is broken. In this respect, in the case of the diaphragm having the aspheric stopper according to the present invention, it is required to increase the applied pressure to 50 Mpa or more to generate the maximum tensile stress exceeding the breaking stress limit of silicon (Si). In other words, since the diaphragm according to the present invention has the aspheric stopper, the operating pressure for protection against maximum pressure (withstand pressure) p thereof can be increased to about 50 Mpa.

Figure 4:
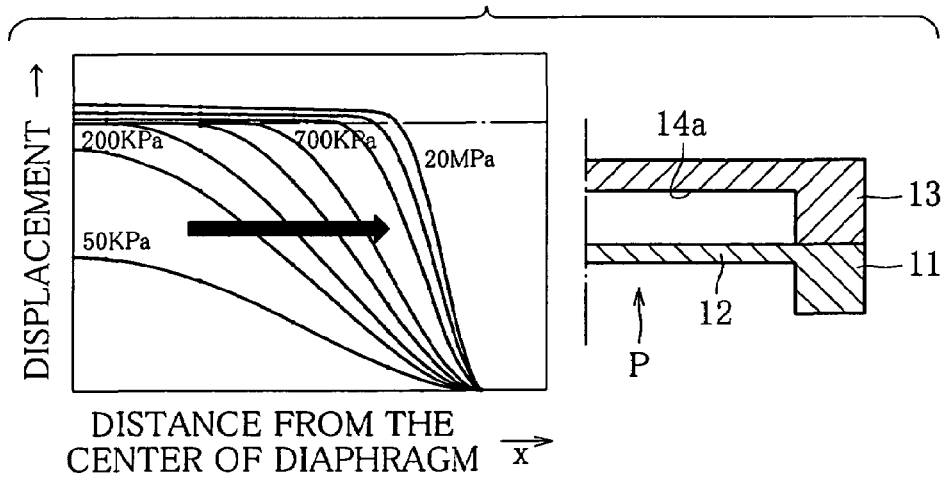
FIG. 4 is a view showing the transition of displacement in relation to the applied pressure of the diaphragm when the stopper members form flat surfaces.
Figure 5:
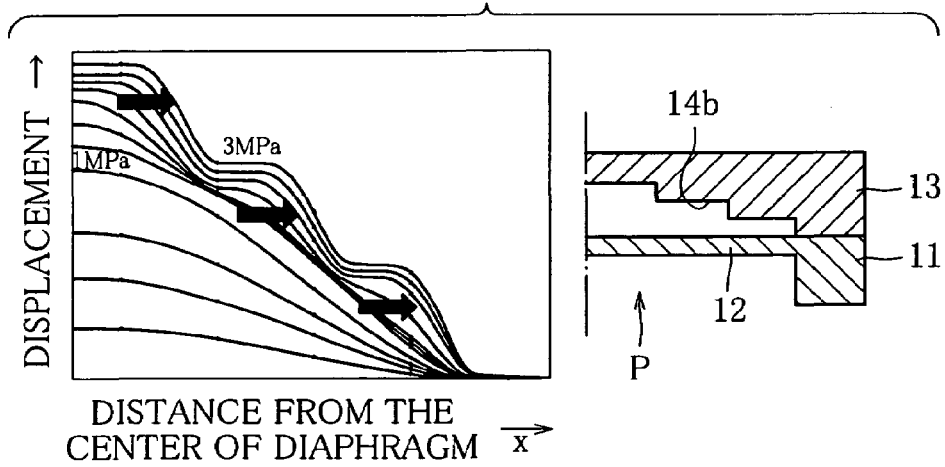
FIG. 5 is a view showing the transition of displacement in relation to the applied pressure of the diaphragm when the stopper members have a stepped shape.
Figure 6:
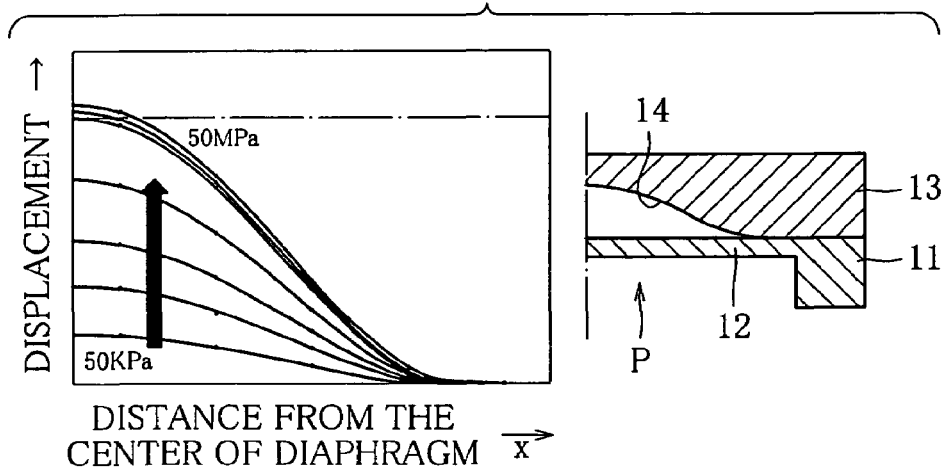
FIG. 6 is a view showing the transition of displacement in relation to the applied pressure of the diaphragm when the stopper members have the shape of a curved surface.

FIGS. 4, 5 and 6 show results of analysis on the displacement amount of the diaphragm when the applied pressure is changed as transition characteristic (change in a displaced form) of the displacement amount according to distance x from the center thereof, in respect of the diaphragm without a stopper, the diaphragm having the stepped stopper disclosed in Unexamined Japanese Patent Publication No. 10-78366, and the diaphragm having the aspheric stopper according to the present invention.

As shown in FIGS. 4, 5 and 6, if the diaphragm is applied with pressure that falls in the range of from about 50 kPa to about 150 kPa, the diaphragm is relatively smoothly displaced in response to the applied pressure. In the case of the diaphragm without a stopper, however, if the applied pressure is over 200 kPa, the diaphragm reaches the displacement limit with respect to the pressure-applied direction, and the stress thereof gradually concentrates in the rim portion of the diaphragm as shown in FIG. 4. As a result, when the applied pressure is over 700 kPa that is the breaking stress limit, the diaphragm is broken due to the stress concentration.

In the case of the diaphragm having the stepped stopper, the diaphragm displaced by the applied pressure of 1 MPa is brought into contact to the stepped stopper, which prevents further displacement. If the applied pressure is further increased, however, stress (displacement) acting in a horizontal direction is slowly created while the contact portion with respect to the stepped stopper serves as a displacement controlling portion at the same time as shown in FIG. 5.

When the applied pressure is over 3 Mpa, the diaphragm is broken due to the stress (displacement) created in the horizontal direction.

In contrast, in the case of the diaphragm having the aspheric stopper according to the present invention, the displacement of the diaphragm is directly received by the entire surface of the aspheric stopper. Therefore, according to the diaphragm of the present invention, the horizontal stress is not generated as shown in FIG. 6. Even if the applied pressure is increased to 50 MPa, the local stress concentration does not occur in the diaphragm, so that a breakdown attributable to stress concentration is not caused. Consequently, it is possible to sufficiently increase the withstand pressure as the pressure sensor device.

Figure 7:
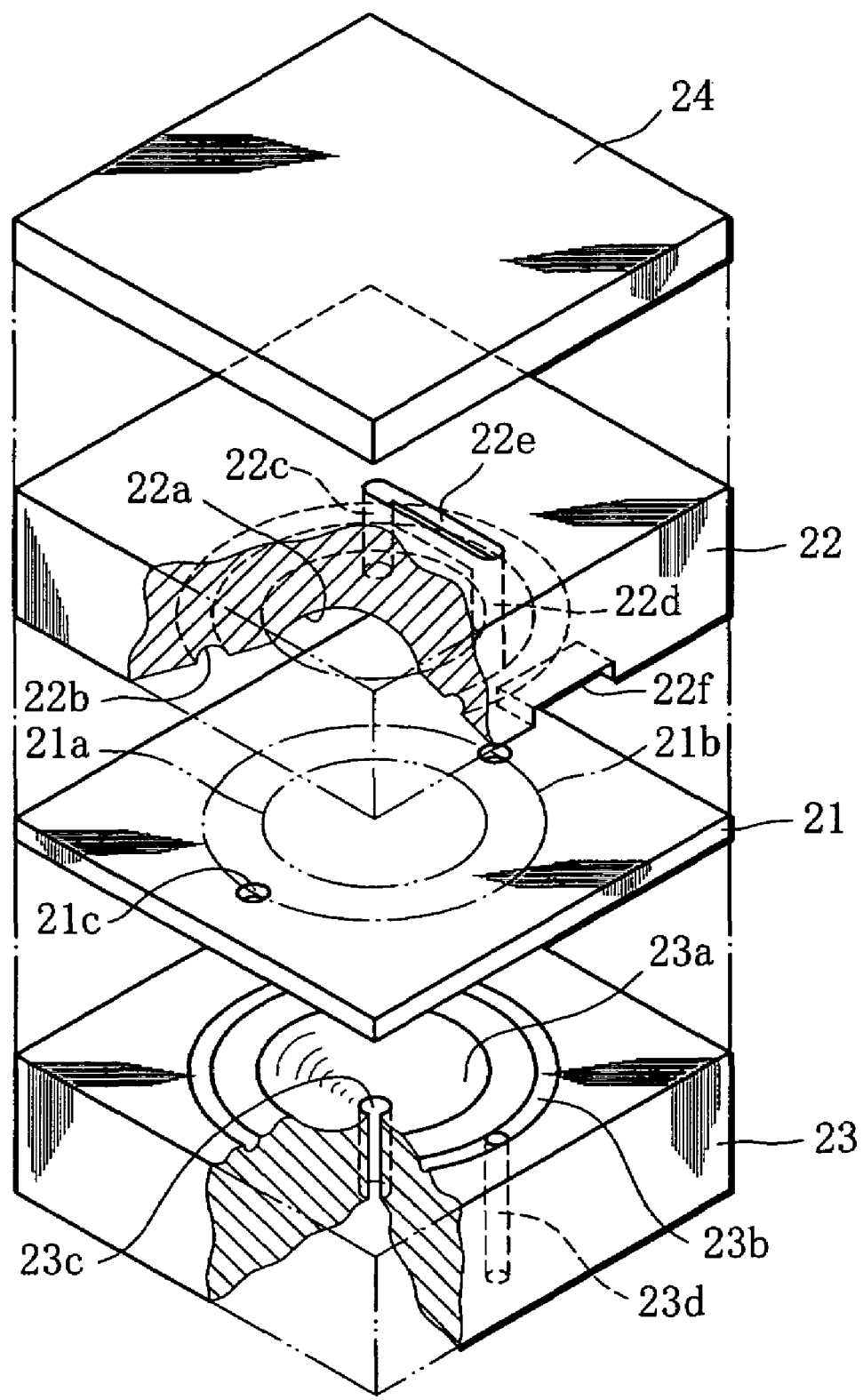
FIG. 7 is an exploded perspective view showing a schematic structure of the pressure sensor device according to one embodiment of the present invention.

A specific embodiment of the pressure sensor device having the aspheric stopper will be described below. FIG. 7 is an exploded perspective view showing a schematic structure of the pressure sensor device according to this embodiment. Reference numeral 21 denotes a laminated base body forming a diaphragm, 22 is a first stopper member provided onto the upper surface of the base body 21, and 23 is a second stopper member provided onto the lower surface of the base body 21. Reference numeral 24 represents a cover provided onto the upper surface of the first stopper member 22.

Figure 8:
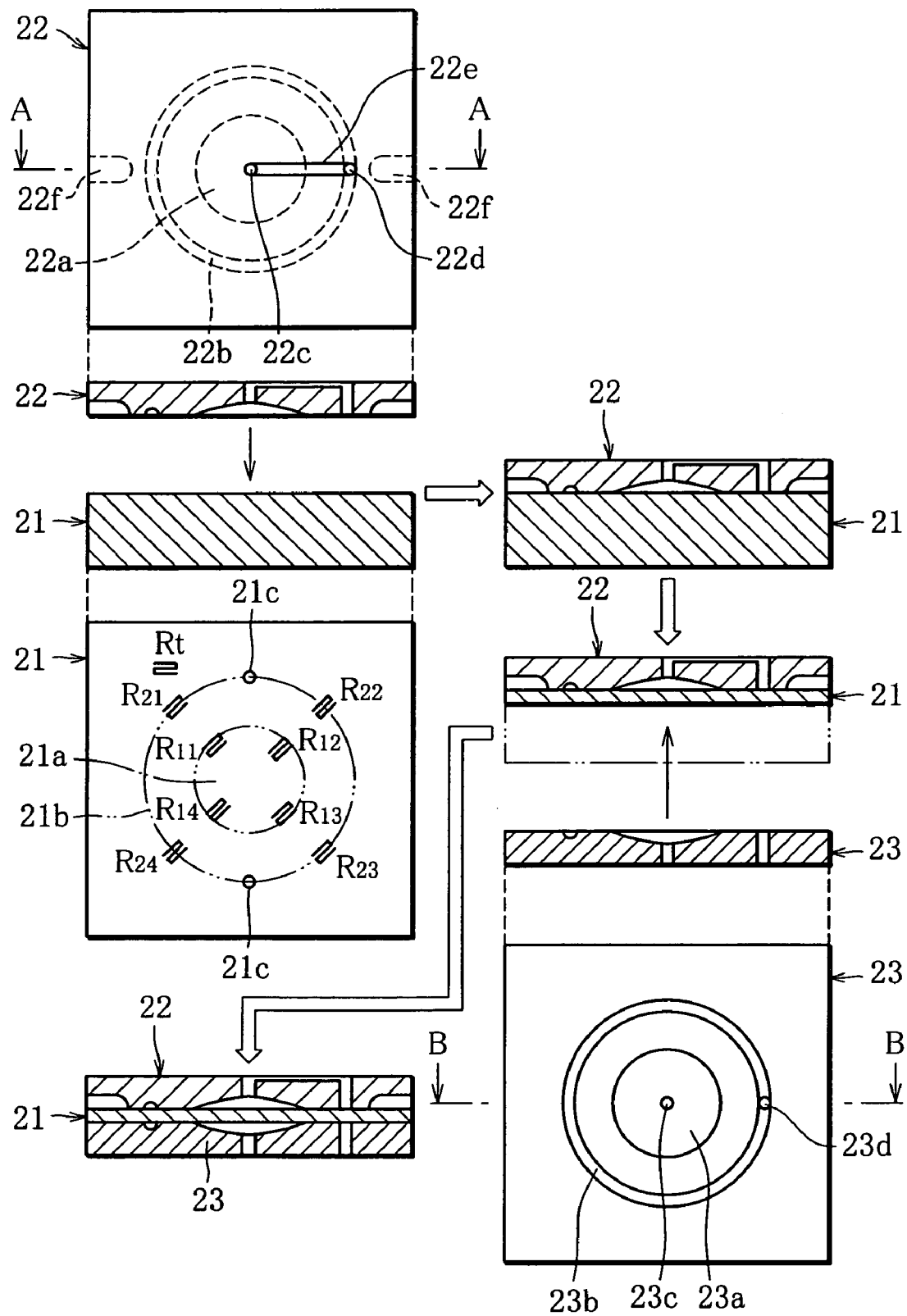
FIG. 8 is a view showing the structure of the pressure sensor device shown in FIG. 5 and the steps of fabricating the same.

The base body 21 is made up of a silicon substrate, the principal surface of which is, for example, a (100) surface. As shown in FIG. 8, a central portion thereof serves as a circular main diaphragm portion 21a that detects differential pressure Δp applied to between both sides thereof with high sensitivity. The rim portion of the main diaphragm portion 21a of the base body 21 is used as a circular auxiliary diaphragm portion 21b for detecting static pressure (mentioned below). Specifically, four strain resistance gauges R11, R12, R13 and R14 for differential pressure detection, which extend in a <110> direction, are formed at intervals of 90 degrees near the rim portion of the main diaphragm portion 21a. In the auxiliary diaphragm portion 21a, four strain resistance gauges R21, R22, R23 and R24 for static pressure detection, which extend in the <110> direction, are arranged at intervals of 90 degrees. Moreover, in a rim position deviated from the diaphragm portions 21a and 21b of the base body 21, there is formed a resistor Rt for temperature detection, which extends in a <100> direction.

In the auxiliary diaphragm portion 21b, there is formed a through-hole 21c piercing through the front and rear faces of the base body 21. The through-hole 21c is designed to lead a pressure-transmitting medium such as silicone oil to both sides of the auxiliary diaphragm portion 21b as described below.

Figure 9:
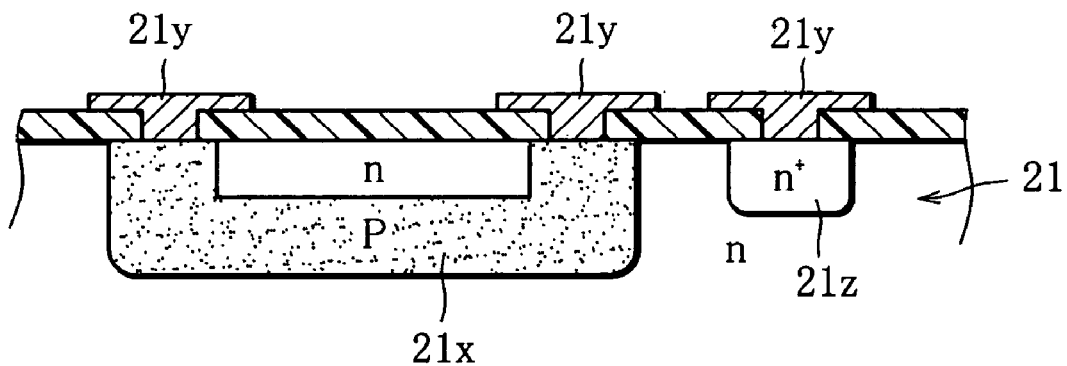
FIG. 9 is a view showing a structure of a strain resistance gauge formed in the diaphragm.

Each of the strain resistance gauges R11 to R14, R21 to R24, and Rt is formed by embedding a p-type resistance layer 21x in the surface of an n-type silicon substrate forming the base body 21, for example, as exemplified in FIG. 9. Electrode extraction from each resistance layer 21x is carried out from both end portions of the resistance layer 21x through an ohmic electrode 21y. In case that a potential of the silicon substrate is detected, an n-type high-impurity layer 21z is formed on the surface of the silicon substrate, for example, by ion injection and diffusion, and the ohmic electrode 21y is provided onto the high-impurity layer 21z.

Figure 10:
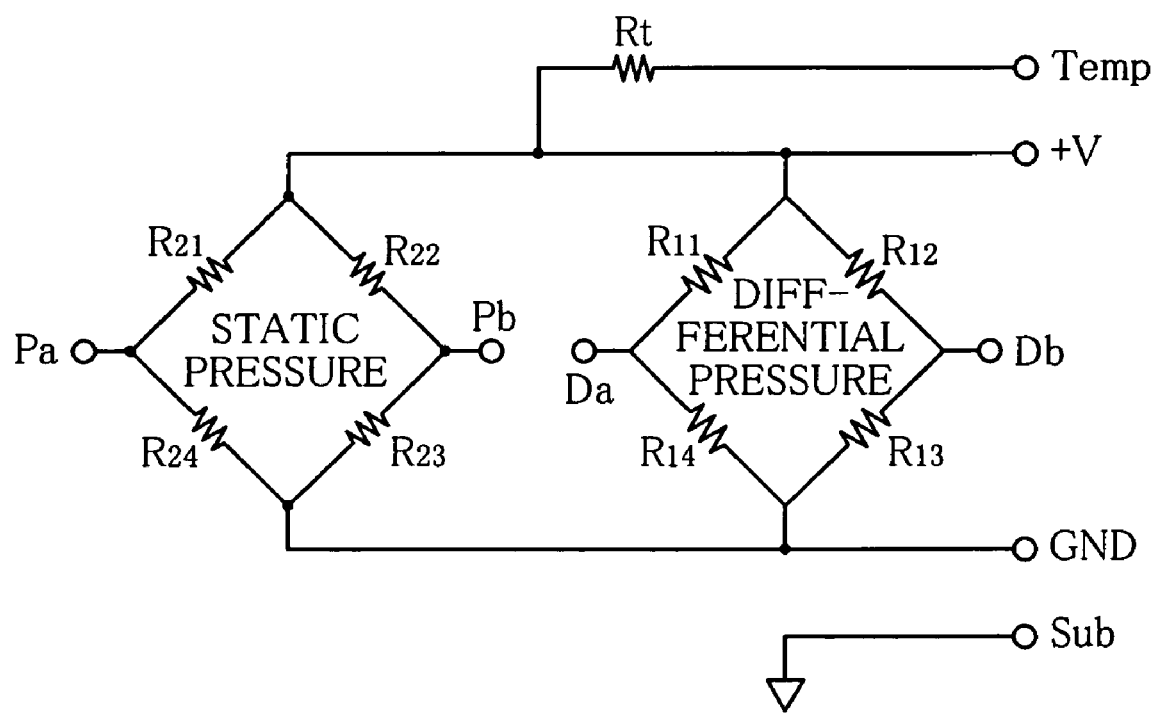
FIG. 10 is a view showing a structure example of a differential pressure/static pressure detection circuit using the strain resistance gauge.

The strain resistance gauges R11-R14 and R21-R24 are bridge-connected to each other, for example, as exemplified in FIG. 10, and are used for differential pressure detection and static pressure detection. To be specific, a differential pressure detection circuit is configured by bridge-connecting the strain resistance gauges R11-R14, and a static pressure detection circuit by bridge-connecting the strain resistance gauges R21-R24. The resistor Rt is used for temperature detection.

Concave portions 22a and 23a having the curved surfaces facing the main diaphragm portion 21a are formed in respective surfaces of the first and second stopper members 22 and 23, the surfaces being located opposite the base body 21. Formed in the first and second stopper members 22 and 23 are circular grooves 22b and 23b facing the auxiliary diaphragm portion 21b. In top portions of the concave portions 22a and 23a in the first and second stopper members 22 and 23, there are formed leading holes 22c and 23c for leading the pressure-transmitting medium with respect to the main diaphragm portion 21a.

Through-holes 22d and 23d piercing through the front and rear faces of the first and second stopper members 22 and 23 are formed in portions of the first and second stopper members 22 and 23, where the grooves 22b and 23b are formed. Specifically, the through-hole 22d formed in the first stopper member 22 is connected to the leading hole 22c through a groove 22e formed in the upper surface of the stopper member 22. When the upper surface of the first stopper member 22 is covered with the cover 24, the groove 22e forms a path for the pressure-transmitting medium, which connects the leading hole 22c and the trough-hole 22d between the cover 24 and the stopper member 22. A cut-off groove 22f formed in an edge portion of the first stopper member 22 forms an electrode-extraction portion of the strain resistance gauges R11, R12, R13, R14 and the like.

The pressure sensor device actualized by using the base body 22 forming the above-described diaphragm and the first and second stopper members 22 and 23 is fabricated, as exemplified in FIG. 8, by integrally joining the base body 21 and the first stopper member 22 to each other in the first place, and polishing and laminating the base body 21 to have prescribed thickness so as to function as a diaphragm. Subsequently, the second stopper member 23 is integrally joined to the rear face side of the laminated base body 21, and the base body 21 forming the diaphragm is sandwiched between the first and second stopper members 22 and 23.

If a pressure sensor device having a withstand pressure of 100 kPa is actualized, for example, the main diaphragm portion 21a is made to have a diameter of 2 mm and a thickness of 30 μm. In this case, a thickness of about 500 μm is sufficient for that of the first and second stopper members 22 and 23. The pressure leading holes 22c and 23c formed in the top portions of the concave portions 22a and 23a are each made to have a diameter of about 0.15 mm. The pressure leading holes 22c and 23c of such dimensions make it possible to smoothly lead the pressure-transmitting medium (silicone oil) to the diaphragm formed in the base body 21 without degrading stopper functions of the concave portions 22a and 23a.

In the pressure sensor device having the above structure, pressure LP is led to the lower surface side of the diaphragm made up of the base body 21 through the leading hole 23c formed in the second stopper member 23. Pressure HPc led into the through hole 23d formed in the second stopper member 23 is guided from the circular groove 23b through the through hole 21c into the circular groove 22b formed in the first stopper member 22, and is led from the through-hole 22d through the groove 22e and the leading hole 22c to the upper surface side of the diaphragm made up of the base body 21. As a result, the diaphragm (main diaphragm portion 21a) formed of the base body 21 is displaced in response to differential pressure ΔP (=HP−LP) between the pressures LP and HP led to both sides (upper and lower surfaces). The degree of this displacement is detected by the strain resistance gauges R11, R12, R13 and R14.

The pressure HP led into the grooves 22b and 23b compresses the auxiliary diaphragm portion 21b from both sides thereof. The static pressure is detected from changes in resistance values of the strain resistance gauges R21, R22, R23 and R24, which are caused by the compression pressure. The configuration in which the static pressure can be detected together with differential pressure makes it possible to detect sensitivity with respect to the differential pressure ΔP of the diaphragm and sensitivity with respect to the static pressure (pressure HP) separately from each other. It is also possible to reduce cross talk between the differential pressure and the static pressure.

Figure 11:
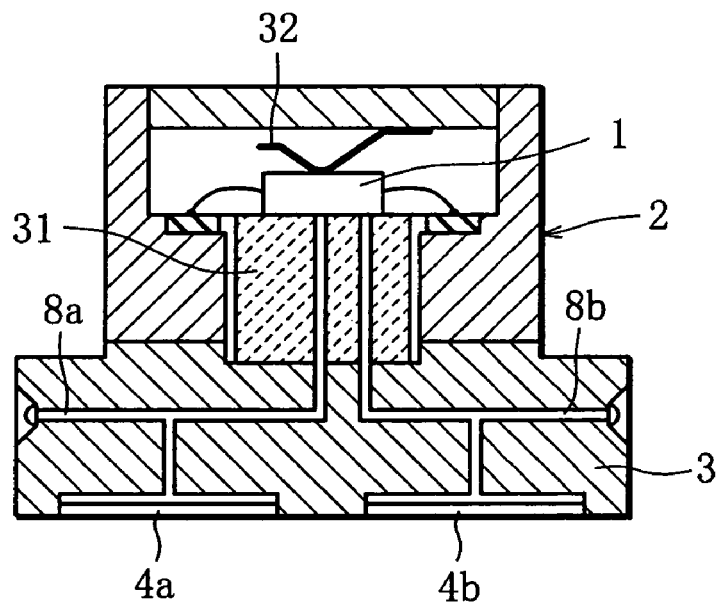
FIG. 11 is a view showing a structure example of a pressure sensor device in which a sensor chip is installed in a meter body.
Figure 12:
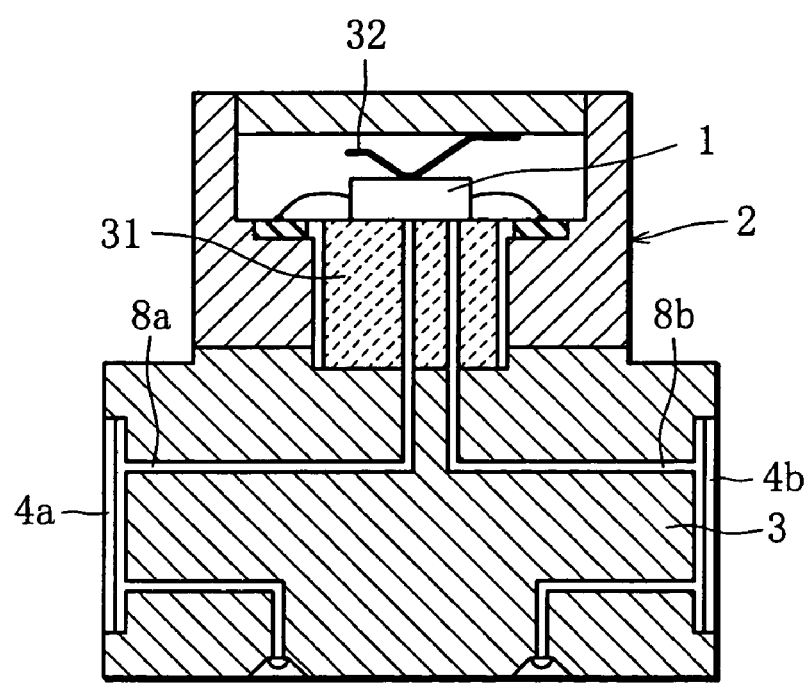
FIG. 12 is a view showing another structure example of the pressure sensor device in which the sensor chip is installed in the meter body.
Figure 13:
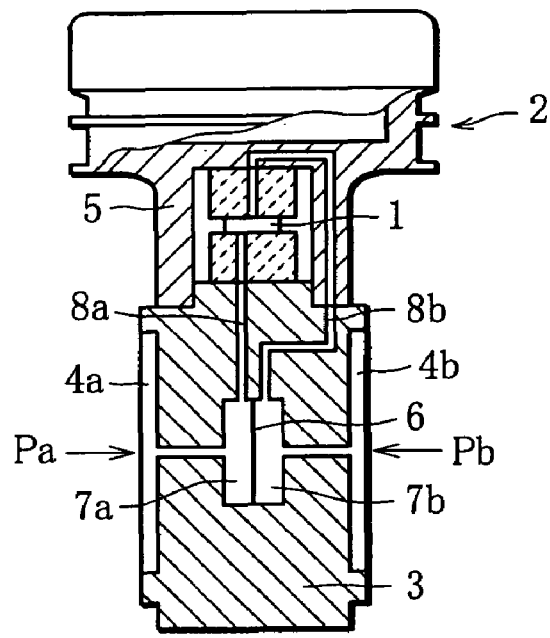
FIG. 13 is a view showing a schematic structure of a conventional pressure sensor device.
Figure 14:
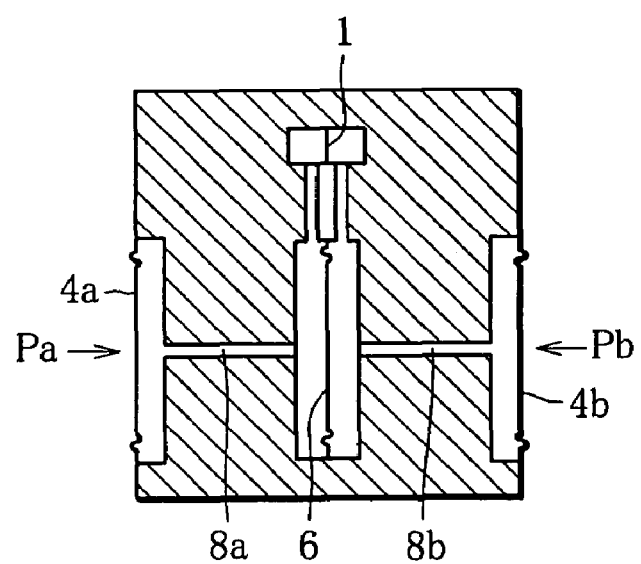
FIG. 14 is a view showing an operation of the meter body in a steady state.
Figure 15:
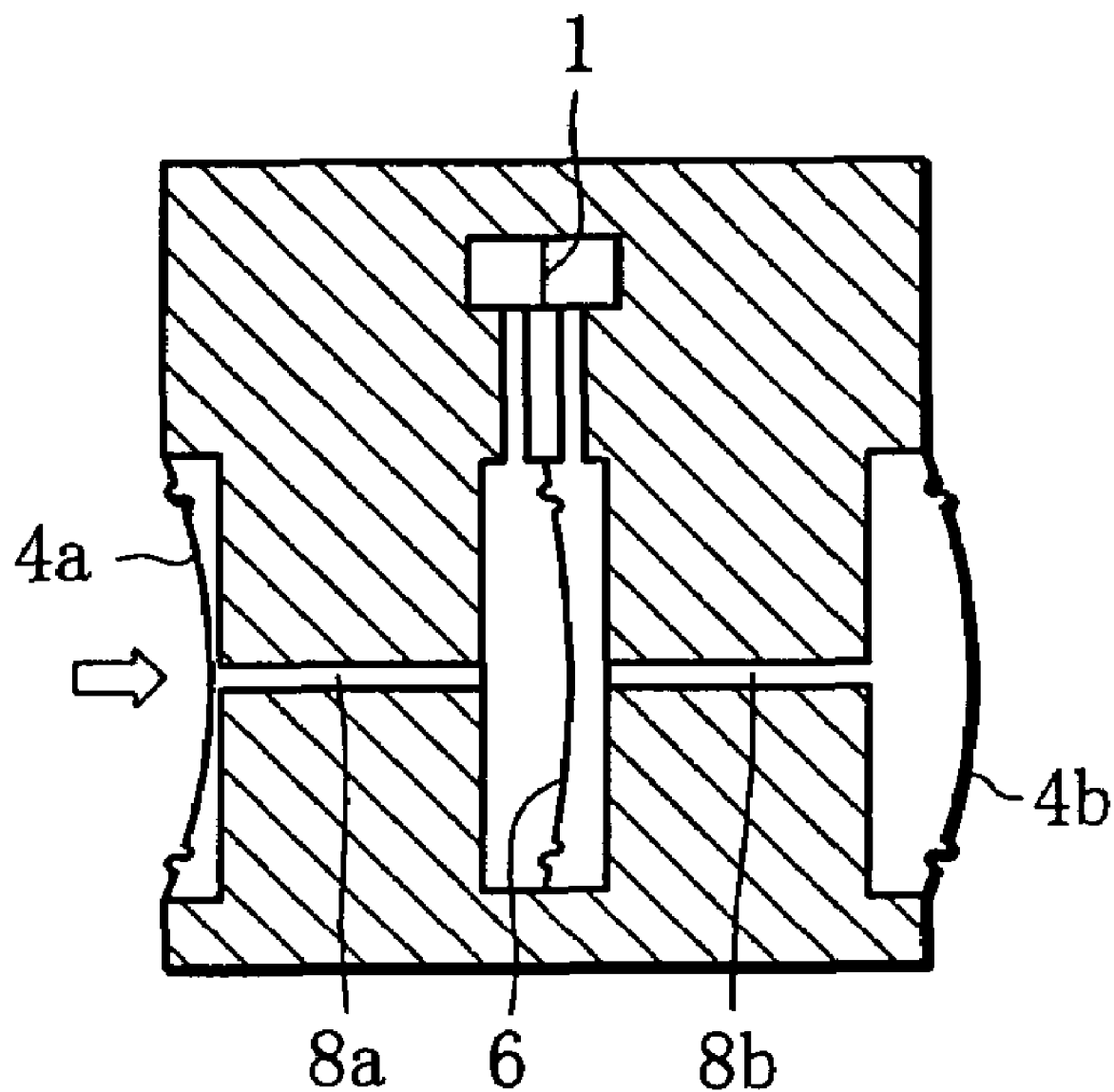
FIG. 15 is a view diagrammatically showing an absorbing operation of maximum pressure, which is carried out by a center diaphragm.

In case that the pressure sensor (sensor chip) having the above structure is installed into a meter body, pressure can be directly led from the pressure-receiving portions 4a and 4b formed in the meter body to the diaphragm, for example, as shown in FIGS. 11 and 12 since the withstand pressure of the diaphragm is sufficiently increased by the first and second stopper members 22 and 23 as mentioned. In other words, if the pressure sensor (sensor chip) having the above structure is used, it is not necessary to apply the structure in which pressure-absorbing chambers 7a and 7b separated from each other by a center diaphragm 6 described above with reference to FIG. 13 are provided to absorb the maximum pressure using the center diaphragm 6. Therefore, the meter body can be substantially downsized since the center diaphragm 6 with a large diameter is not required, which enables actualization of a compact sensor device having high withstand pressure.

In the pressure sensor device shown in FIG. 11, the pressure-receiving portions 4a and 4b are juxtaposed to each other on the bottom surface of the meter body. In the pressure sensor device shown in FIG. 12, the pressure-receiving portions 4a and 4b are provided to opposed sides of the meter body. Either structure does not require the center diaphragm 6 in the inside of the meter body, which offers a practically significant advantage that the downsizing thereof and the simplification of the structure can be achieved.

In FIGS. 11 and 12, reference numeral 31 denotes a glass seat supporting a sensor chip 1, and functions as a pressure-absorbing body of the sensor chip 1 with respect to the meter body made of brass, stainless steel or the like. Reference numeral 32 represents a spring member for fixing the sensor chip 1 to the seat 31. In case that the sensor chip 1 is installed in the meter body in this manner, it is desirable that corner portions of the square base body 21, and those of the first and second stopper members 22 and 23 shown in FIG. 7 be cut off to form the sensor chip 1 itself into a circular shape (discoid shape).

The present invention is not limited to the above-described embodiment. For example, the diameter and thickness of the diaphragm may be set according to specification of pressure detection. The strain resistance gauges for static pressure detection are not necessarily required in a pressure sensor device. Needless to say, although the above explanation is provided mainly about the sensor for differential pressure detection, a pressure sensor having a structure in which a stopper member is provided only to one side of the diaphragm can be realized. In addition, various modifications can be made without deviating from the gist of the present invention.

The invention claimed is:

1. A pressure sensor device comprising:
a thin diaphragm made of brittle material, in which a strain resistance gauge is formed in a surface thereof; and
a stopper member including a concave portion comprising a curved surface parallel to a surface formed by displacement of said diaphragm, said concave portion being disposed so as to face said diaphragm;
wherein said stopper member comprises a leading hole for a pressure-transmitting medium to be led to said diaphragm in a top portion of the concave portion having the curved surface parallel to the surface formed by displacement of said diaphragm.

2. A pressure sensor device comprising:
a diaphragm in which a strain resistance gauge is formed in a surface;
a pair of stopper members having respective concave portions in the shape of curved surfaces parallel to surfaces formed by displacement of said diaphragm, the stopper members being disposed at respective sides of said diaphragm so that said concave portions face said diaphragm; and
a base having fluid paths that lead a pressure-transmitting medium from top portions of said concave portions in said stopper members to both sides of said diaphragm and a pair of pressure-receiving portions connected to said respective fluid paths to transmit pressure to the pressure-transmitting medium injected into said fluid paths.

3. The pressure sensor device according to claim 2, wherein a sensor chip, which is formed of said diaphragm and said pair of stopper members, is fixed to said base with a pressure-absorbing body interposed therebetween.

4. The pressure sensor device according to claim 2, wherein said pair of pressure-receiving portions comprises a pair of diaphragms provided to the base.

5. A pressure sensor device comprising:
a thin diaphragm made of brittle material, in which a strain resistance gauge is formed in a surface thereof;
a stopper member including a concave portion comprising a curved surface parallel to a surface formed by displacement of said diaphragm, said concave portion being disposed so as to face said diaphragm; and
another said stopper member,
wherein the stopper members are disposed so as to face respective sides of said diaphragm; and
wherein each of said stopper members comprises a leading hole for a pressure-transmitting medium to be led to said diaphragm in a top portion of the concave portion having the curved surface parallel to the surface formed by displacement of said diaphragm.

* * * * *